April 6, 1965  D. P. SHILEY  3,176,620
HIGH PRESSURE CRYOGENIC TURBINE DRIVEN PUMP
Filed July 12, 1961  2 Sheets-Sheet 1

INVENTOR.
Donald P. Shiley
BY
ATTORNEYS

April 6, 1965 D. P. SHILEY 3,176,620
HIGH PRESSURE CRYOGENIC TURBINE DRIVEN PUMP
Filed July 12, 1961 2 Sheets-Sheet 2
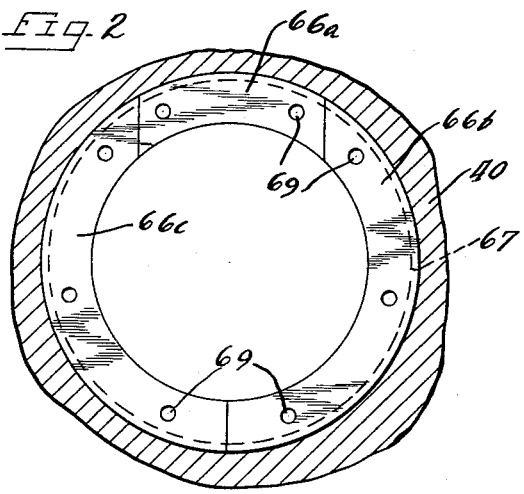
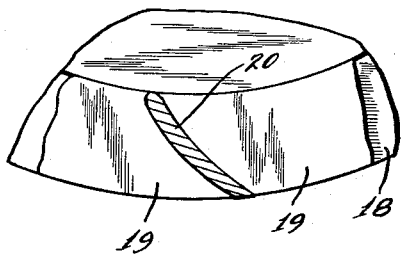
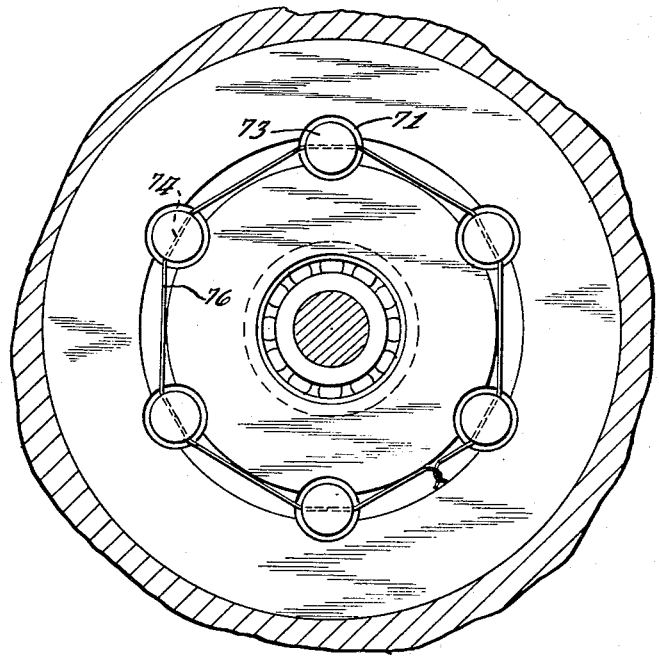
INVENTOR.
Donald P. Shiley
BY
ATTORNEYS

United States Patent Office 3,176,620
Patented Apr. 6, 1965

3,176,620
HIGH PRESSURE CRYOGENIC TURBINE DRIVEN PUMP
Donald P. Shiley, El Segundo, Calif., assignor to Thompson Ramo Wooldridge Inc., Cleveland, Ohio, a corporation of Ohio
Filed July 12, 1961, Ser. No. 123,594
4 Claims. (Cl. 103—87)

This invention relates generally to pumping apparatus and more particularly relates to a high pressure cryogenic turbine driven pump suitable for pumping fuel such as liquid hydrogen or the like.

In accordance with the principles of the present invention, a turbine wheel and plural centrifugal impellers, each having a center inlet and radial pumping passages, are interconnected by a shaft for unison rotation. Along the length of the shaft, there is provided a seal arrangement wherein two rotating face seals mounted back-to-back form a chamber between which is purged with helium gas to carry away any seal leakage gas.

Further, the shaft passes through a spacer which is surrounded by a soft bearing metal snubber to absorb eccentricity of the shaft at high speed operation.

In accordance with a particular bearing arrangement associated with the shaft and the pump, back-to-back radial centrifugal impellers are separated by a bearing assembly including an inner race ring mounted on the shaft and an outer race ring which is clamped between opposed mounting plates, the mounting plates being, in turn, clamped onto a multiple piece key ring seated in a pump housing groove.

Thus, the pump construction provided permits the development of high pressures under adverse environmental operating conditions.

It is an object of the present invention to provide an improved high pressure cryogenic turbine driven pump.

Another object of the present invention is to provide a seal arrangement wherein two rotating face seals mounted back-to-back are purged with helium gas to carry away any seal leakage gas.

Yet another object of the present invention is to provide a bearing and spacer arrangement for a turbine driven pump wherein the eccentricity of the shaft at high speed operation is effectively absorbed.

Many other advantages, features and additional objects of the present invention will become manifest to those versed in the art upon making reference to the detailed description which follows and the accompanying sheets of drawings in which a preferred structural embodiment of a high pressure cryogenic turbine driven pump embodying the principles of the present invention is shown by way of illustrative example.

On the drawings:

FIGURE 2 is a cross-sectional view taken generally on line II–II of FIGURE 1;

FIGURE 3 is a cross-sectional view taken generally on line III—III of FIGURE 1; and FIGURE 4 is a fragmentary cross-sectional view taken on line IV—IV of FIGURE 1.

As shown on the drawings:

Figure 1:
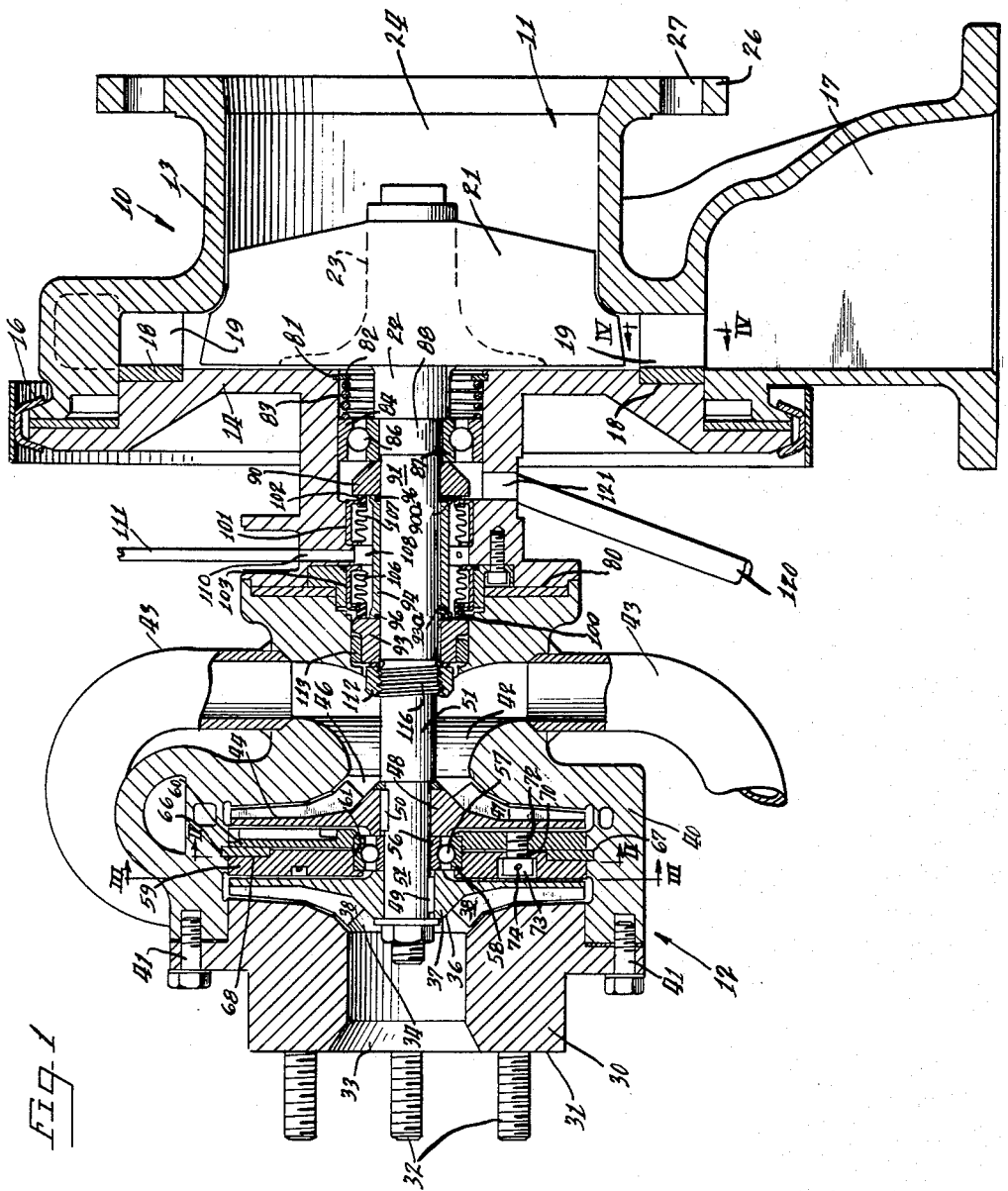
FIGURE 1 is a cross-sectional view of a high pressure cryogenic turbine driven pump provided in accordance with the principles of the present invention.

Although the principles of the present invention are generally applicable to any pumping apparatus, the features of the present invention find a particularly useful applicability to a high pressure cryogenic turbine driven pump for handling a fluid such as liquid hydrogen fuel.

The pump of the present invention is shown generally at 10 in FIGURE 1 and includes a driving motor such as a turbine shown generally at 11 and pumping means shown generally at 12.

More specifically, it will be noted the turbine 11 includes first and second casing parts 13 and 14 held together by a clamping device shown generally at 16, thereby to form an inlet 17 for a gaseous driving fluid. There is also retained between the housing parts 13 and 14 a nozzle ring 18 which has a plurality of nozzle passages 19 formed therein. The nozzle ring 18 is shown in appropriate detail in FIGURE 4 and it will be noted the nozzle passages 19 are separated from one another by vane elements shown at 20, thereby to contribute to the expansion and direction of the gases towards the blades 21 of a turbine wheel carried at one end of a shaft 22. The turbine wheel is shown as including a hub 23 surrounded by a plurality of circumferentially spaced blades so that fluid directed against the blades through the nozzle passages 19 will rotatably drive the turbine wheel and the spent fluid will be directed out of an outlet 24. The outlet is flanged as at 26 and has a plurality of openings 27 by means of which the casing part 13 may be connected with or associated with a hydraulic driving circuit.

Referring now more specifically to the pump 12, it will be noted there is formed a first casing part 30 having an end surface 31 characterized by a plurality of axially projecting threaded studs 32 by means of which the pump may be attached to a mounting pad. A center inlet 33 is formed in the casing part 30, thereby to direct a fluid medium to be pumped into a center inlet 34 of an impeller shown generally at 36 and including a center hub portion 37 and a plurality of radially outwardly extending pumping passages each shown at 38.

The pump 12 further includes a second casing part 40 which is connected by a plurality of fasteners 41 to the casing part 30. The casing part 40 also has a center inlet 42 formed therein. The casing part 40 has connected therewith appropriate conduit means shown at 43 by means of which the inlet 42 may be supplied from the same source as the inlet 33.

A centrifugal impeller shown generally at 44 has a center inlet 46 directing fluid to a plurality of radially extending pumping passages 47 disposed outwardly of a center hub portion 48. The respective hub portions 37 and 48 are keyed as at 49 and 50, respectively, to a shaft 51. The shaft 51 has a reduced section 52 mounting the impeller hubs 37 and 48 and includes progressively enlarged portions which extend towards the turbine wheel 21.

In order to provide a bearing support for the impeller construction, there is disposed between the respective impellers 36 and 44 a bearing assembly which includes an inner race ring 56 carried on the reduced section 52 of the shaft 51 and surrounded by a plurality of shiftable members such as circumferentially spaced balls 57. The balls 57 are confined by an outer race ring 58 which outer race ring is clamped between opposed mounting plates shown at 59 and 60, respectively.

To assist in clamping the outer race ring 58, the opposed mounting plates 59 and 60 together form a recess shown at 61.

The opposed mounting plates clamp the outer race of the bearing and, in turn, are clamped onto a multiple piece key ring shown generally in FIGURE 1 at 66.

In the present illustrative form of the invention, the multiple piece key ring includes three pieces including the pieces shown in FIGURE 2 at 66a, 66b and 66c.

To accommodate the key ring, the casing 40 is provided with an annular recess 67, while the mounting plate 59 is recessed as at 68, thereby to accommodate insertion of the three piece key ring. It will be noted the various parts 66a, 66b and 66c are provided with apertures shown generally at 69. Such apertures 69 are pull-out holes which facilitate disassembly of the device if desired.

In order to clamp the opposed mounting plates 59 and 60 together, it will be noted that the mounting plate 59 is provided with a plurality of counterbored apertures, each aperture being indicated at 70 and the counterbore being indicated at 71, thereby to accommodate a threaded bolt 72 headed as at 73. Moreover, each head 73 is formed with an aperture 74 through which extends a locking wire 76, thereby to prevent tampering or inadvertent disassembly.

It will be noted that the casing part 14 is formed as a one piece housing and bearing construction, the bearing portion of the part 14 comprising an axially extending portion which is interconnected with the casing part 40 as at 80.

The casing part 14 is provided with an annular notch 81 in which is received a snap ring 82 bottoming a coil spring 83 having its opposite end engaging against an outer race 84 of a bearing assembly which also includes a plurality of balls 86 engaging an inner race ring 87 carried on a portion 88 of the shaft 51.

A seal nose ring 90 having a back-face 90a, is mounted on the shaft 51 at a section 91. A second seal nose ring 93 having a back-face 93a, is also carried on the shaft 51 at the portion 91 in spaced relation to the seal nose ring 90. A spacer sleeve 94 is interposed between the seal nose rings 93 and 90 and includes a sealing member 96 at each respective end.

In accordance with the present invention, a seal arrangement is provided wherein the seal nose ring 90 and the seal nose ring 93 provide two rotating face seals. A sealing construction is provided, however, wherein a seal ring 100 and a seal ring 102 carried in respective cartridges 103 and 101, respectively, are engaged with diaphragms 106 and 107, thereby to maintain a firm rotary seal engagement with the nose rings 93 and 90.

The rotating face seals being mounted in back-to-back relation, form a chamber 108 which is purged with helium gas to carry away any seal leakage gas. To effect that end, the casing 14 has a passage 110 formed therein connected by means of a conduit 111 to a suitable source of helium gas.

The shaft 51 in passing through the spacer sleeve 94 also passes through the seal nose ring 93 which is surrounded by a soft bearing metal snubber 113 which operates to absorb eccentricity of the shaft 51 at high speed operation.

The entire assembly is clamped together axially by a nut 114 engageable with a threaded portion 116 formed on the shaft 51.

A conduit 120 is conected to an opening 121 in the casing section 14 leading to the bearing assembly 84, 86, 87, thereby to provide a nitrogen oil purge.

Although minor modifications might be suggested by those versed in the art, it should be understood that I wish to embody within the scope of the patent warranted hereon all such modifications as reasonably and properly come within the scope of my contribution to the art.

I claim as my invention:

1. In a pump having a shaft rotatably mounted therein, a casing, opposed mounting plates in said casing having inner recesses formed therebetween, a bearing assembly including an outer race ring clamped in the inner recess of said mounting plates, and an inner race ring forming a part of said bearing assembly and a pumping impeller means mounted on said shaft and having a portion of said shaft inserted in said inner race ring.

2. In a pump having a shaft rotatably mounted therein, a casing, opposed mounting plates in said casing having inner and outer recesses formed therebetween, a bearing assembly including an outer race ring clamped in the inner recess of said mounting plates, an inner race ring forming a part of said bearing assembly, a pumping impeller means mounted on said shaft and having a portion of said shaft inserted in said inner race ring, and key ring means in said outer recess to retain said mounting plates in assembly with said casing.

3. In a pump, a rotatable shaft, a pair of rotatable centrifugal impellers on said shaft in general back-to-back relation, each having a center inlet and radial pumping passages, a bearing assembly between said impellers comprising an inner race ring carried on said shaft, a plurality of shiftable members such as balls on said race ring, an outer race ring confining said shiftable members, a pair of radially outwardly extending opposed mounting plates having an inner recess formed therebetween for receiving and clamping said outer race ring and casing means carrying said mounting plates and forming a hydraulic pumping circuit for the impellers.

4. In a pump, a casing, a groove in said casing, opposed mounting plates in said casing, a bearing assembly including inner and outer races confining shiftable members therebetween, said mounting plates having an inner recess and an outer recess, said outer race being received in said inner recess, and a three piece key ring seated in said groove in said pump casing, said inner recess clamping said outer race and said outer recess, in turn, clamping said three piece key ring seated in said groove in the pump housing.

References Cited by the Examiner

UNITED STATES PATENTS

| | | | |
|---|---|---|---|
| 2,127,985 | 8/38 | Philpott | 230—128 |
| 2,139,373 | 12/38 | McKinley | 103—111 |
| 2,393,691 | 1/46 | Karassik | 103—87 |
| 2,512,697 | 6/50 | Grotenhuis | 277—59 |
| 2,804,826 | 9/57 | Gilker | 103—104 |
| 2,903,970 | 9/59 | Elovitz | 103—111 |
| 2,916,198 | 12/59 | Weisel | 230—116 |
| 2,939,626 | 6/60 | Birmann | 230—116 |
| 2,940,658 | 6/60 | Birmann | 230—116 |
| 2,961,968 | 11/60 | Thomas et al. | 103—104 |
| 3,029,081 | 4/62 | Marsh | 277—59 |
| 3,036,846 | 5/62 | Peras | 277—59 |

FOREIGN PATENTS 735,957   6/43   Germany.

LAURENCE V. EFNER, *Primary Examiner.*

JOSEPH H. BRANSON, Jr., ROBERT M. WALKER, *Examiners.*